(12) United States Patent
Riess (10) Patent No.: US 7,264,103 B2
(45) Date of Patent: Sep. 4, 2007

(54) RELEASE DEVICE FOR A FRICTION CLUTCH

(75) Inventor: Thomas Riess, Hassfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 211 days.

(21) Appl. No.: 11/112,452

(22) Filed: Apr. 22, 2005

(65) Prior Publication Data

US 2005/0236250 A1    Oct. 27, 2005

(30) Foreign Application Priority Data

Apr. 24, 2004   (EP)  ................................ 04009754

(51) Int. Cl.
*F16D 23/14*      (2006.01)
(52) U.S. Cl. .................... 192/98; 192/110 B
(58) Field of Classification Search ............... None
See application file for complete search history.

(56) References Cited

U.S. PATENT DOCUMENTS

| 2,445,638 | A | * | 7/1948 | Saks .................. 192/70.27 |
| 3,489,256 | A | * | 1/1970 | Binder et al. ............... 192/98 |
| 3,973,659 | A | * | 8/1976 | Ernst et al. ............... 192/98 |
| 4,159,052 | A | | 6/1979 | Ernst et al. |
| 4,201,282 | A | * | 5/1980 | Ernst et al. ............... 192/98 |
| 6,684,997 | B2 | | 2/2004 | Klopfer et al. |

FOREIGN PATENT DOCUMENTS

| DE | 101 14 844 | | 9/2002 |
| DE | 101 36 424 | | 10/2002 |
| GB | 814 693 | | 6/1959 |
| GB | 2 157 791 A | * | 10/1985 |

* cited by examiner

*Primary Examiner*—Rodney H. Bonck
(74) *Attorney, Agent, or Firm*—Cohen Pontani Lieberman & Pavane LLP (57) ABSTRACT

A release device for a friction clutch includes a guide tube, a sliding sleeve mounted on the guide tube, and a release bearing mounted coaxially to the sliding sleeve, the bearing including a first bearing race, rolling elements, and a rotating second bearing race. The second bearing race supports a connecting element, which establishes the working connection between the release bearing and the ends of spring tongues of a diaphragm spring, which serves as the actuating element of the friction clutch. The connecting element has a receiving section, which holds the ends of the diaphragm spring tongues and can shift position in the radial direction in opposition to a restoring force, and a retaining section for the second bearing race. Radial is placement of the ends of the diaphragm spring tongues which occurs upon axial actuation of the releasing device can be absorbed by the connecting element with essentially no friction.

19 Claims, 12 Drawing Sheets

RELEASE DEVICE FOR A FRICTION CLUTCH

BACKGROUND OF THE INVENTION

1. Field of the Invention

The invention pertains to a release device for a friction clutch of a motor vehicle, having a diaphragm spring with spring tongues having radially inner ends which can be moved axially in opposition to a restoring force in order to release the clutch, the spring tongues pivoting so that the inner ends move radially as they move axially. The device includes a guide tube; a sliding sleeve received on the guide tube and movable axially with respect to the guide tube; a release bearing mounted coaxially to the sliding sleeve, the release bearing having a first bearing race which is fixed against rotation with respect to the sliding sleeve, a second bearing race which is rotatable with respect to the first bearing race, and a plurality of rolling elements between the bearing races; and a connecting element which is located between the second bearing race and the inner ends of the spring tongues.

2. Description of the Related Art

A release device of this type serves to actuate a vehicle clutch equipped with a release element in the form of a diaphragm spring, where the free, radially inward-directed ends of the diaphragm spring rest against a roller bearing mounted on a sliding sleeve. To perform a release movement, a release crank or actuator acts on the sliding sleeve. Thus, if the clutch is of the push type, the sliding sleeve moves axially toward the clutch, and the tongues of the diaphragm spring, which are supported on the release bearing by way of a connecting element, undergo some deformation initially and then become essentially rigid. They thus act now as levers, which pivot around a center of rotation on the clutch housing, as a result of which the load being exerted on the pressure plate of the clutch is released. The means that, in the contact area between the releasing device and the diaphragm spring, the initial axial movement of the clutch release bearing is converted into a more-or-less circular pivoting movement of the diaphragm spring. The ends of the diaphragm spring tongues are therefore shifted radially inward, which is necessarily accompanied by friction between the ends of the diaphragm spring tongues and the axial contact surface of the releasing device. It is therefore necessary to apply not only the releasing force itself but also the effective frictional force, and this is expressed as a hysteresis in the characteristic force curve of the clutch pedal and leads as a consequence to an increase in the pedal force. The longer the vehicle is in service, the greater the wear at the contact point, which leads to an even greater increase in the frictional losses.

To improve the clutch-release properties, it is known from DE 101 36 424 C1, for example, that a plastic disk can be installed axially between the tongues of the diaphragm spring and the co-rotating ring of the clutch release bearing, as a result of which the frictional losses can be reduced. Systems of this type are subject to wear, however, and become ineffective after the releasing device has been in operation for a certain period of time.

SUMMARY OF THE INVENTION

The invention has the goal of providing a release device in which the friction between the clutch release bearing and the diaphragm spring is reduced even further. Another goal is to improve the connecting element installed between the release bearing and the diaphragm spring of the clutch.

According to the invention, the connecting element has a retaining section which is supported against the second bearing race and a receiving section which engages the inner ends of the spring tongues, the receiving section being resiliently radially movable with the inner ends of the spring tongues.

The inventor realized that the frictional losses in the area of the ends of the tongues of the diaphragm spring can be significantly reduced if the connecting element mounted on the release bearing and the ends of the spring tongues cooperating with the connecting element are both able to execute the same type of movement. The invention is also based on the insight that it is possible for an axial movement of the releasing device and an additional radial movement of the connecting element to simulate the more-or-less circular pivoting movement of the diaphragm spring tongues. These fundamental inventive ideas are realized by dividing the connecting element functionally into a retaining section and a receiving section. The retaining section ensures that the rotating bearing ring is carried along rotationally, whereas the receiving section accepts the tongues of the diaphragm spring, the receiving section being able to shift position in the radial direction in opposition to a restoring force. During an axial movement of the clutch release bearing, the ends of the diaphragm spring tongues are supported against the receiving section, and as they pivot along their path they push the receiving section in the radial direction. In the axial direction, however, the connecting element is designed to be comparatively stiff, as a result of which the axial movement of the release bearing can be transmitted essentially without loss to the ends of the diaphragm spring tongues. The restoring force of the receiving section of the releasing device has the effect of allowing the receiving section to rest without play against the diaphragm spring tongues during every phase of the engagement and release of the friction clutch, which guarantees the direct transmission of force.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
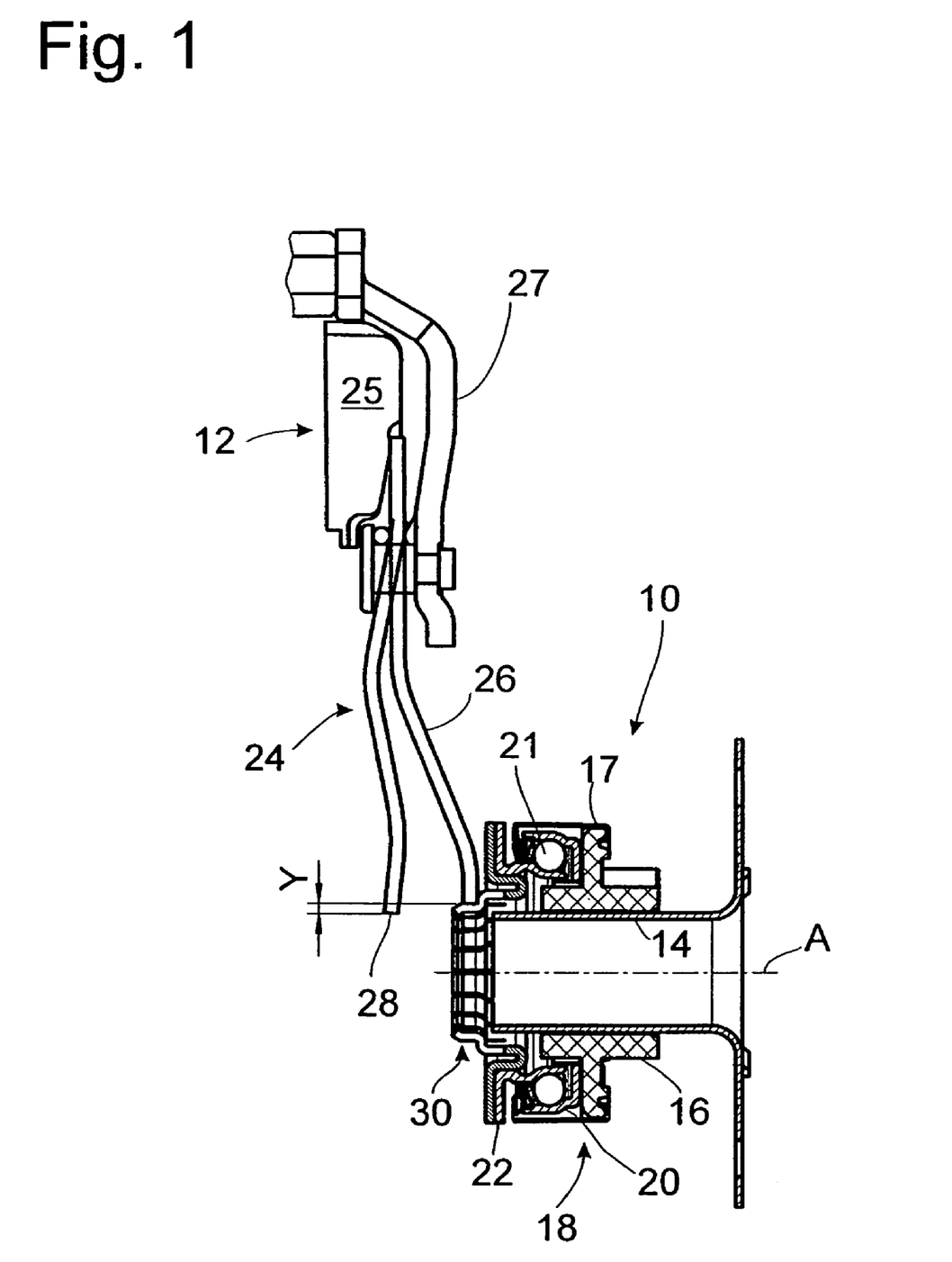
FIG. 1 is an overall diagram of a releasing device with a connecting element on the release bearing.
Figure 2:
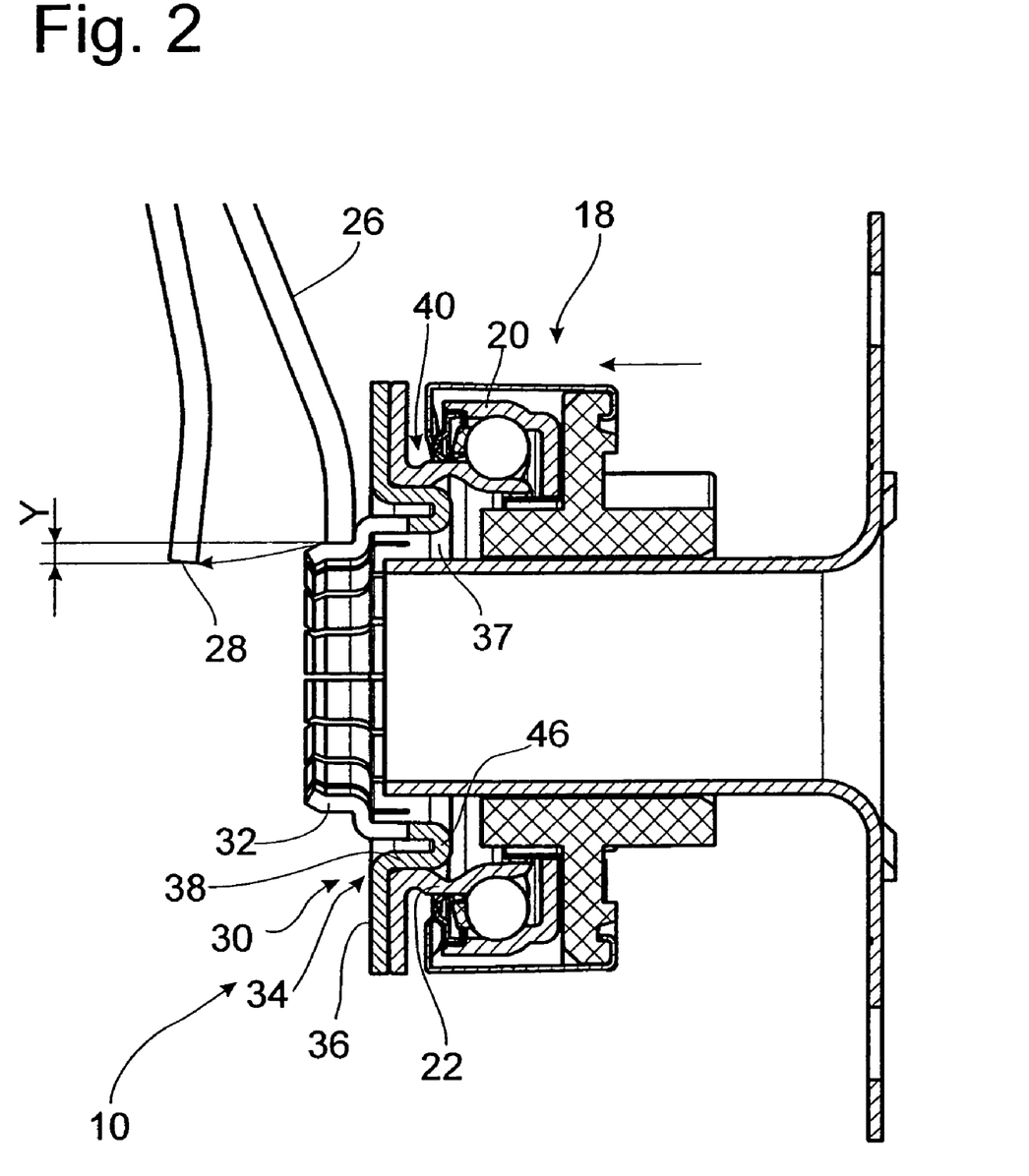
FIG. 2 shows an enlarged, detailed view of the releasing device according to FIG. 1.

FIG. 1 shows an overall diagram of a releasing device 10 with a sliding sleeve 16, which surrounds a guide tube 14 and carries at one end a release bearing 18 in the form of a roller bearing, which is in contact with the spring tongues 26 of a diaphragm spring 24 so that it can actuate a friction clutch 12. The roller bearing 18 has an outer, first bearing ring 20, which rests against a ring-shaped flange 17. This outer ring is free to slide in the radial direction on the flange and thus provides the release bearing with a self-adjusting action. The bearing also has an inner, second bearing ring 22 and rolling elements (balls) 21, which are guided on the raceways of the bearing rings 20, 22. The diaphragm spring 24 constitutes the release element of the friction clutch 12; the radially outer area of this spring acts on a pressure plate 25 and, when the clutch is engaged, the spring exerts force on a clutch disk (not shown) and on a flywheel (not shown). The diaphragm spring 24 is attached at several points around the circumference to a clutch housing 27, around which points, during the clutch release operation, the free ends 28 of the spring tongues 26 can pivot radially to a limited extent in the plane of the drawing with respect to the axis A of the releasing device. The working connection between the roller bearing 18 and the spring tongues 26 is produced by a connecting element 30, mounted on the inner ring 22 of the roller bearing 18. As indicated in FIG. 2, this connecting element has a receiving section in the form of a pivot arm 32, which can shift position elastically in opposition to a restoring force. With its radially oriented contact section 50 and axially oriented contact section 52 (FIG. 3), this pivot arm receives and supports the free end 28 of a tongue 26 of the diaphragm spring. To produce a connection which is free of axial play, a snap-in contour 54 in the form of a radially outward-oriented radial bead is designed on the pivot arm 32; the diaphragm spring tongues 26 are able to snap into this bead. The pivot arm 32 first extends essentially in the axial direction and then continues as a radially oriented center area 46, to which a tubular section 38, extending at least for a certain distance parallel to the pivot arm 32, is connected. The tubular section leads in turn to a radially outward-extending area, which forms a disk 36. As can be seen especially clearly in FIG. 2, the disk 36 and the axially oriented tubular section 38 form a retaining section 34, by means of which the connecting element 30 is supported on a correspondingly designed extension 40 of the rotating bearing ring 22. The connection between the connecting element 30 and the rotating bearing ring 22 can have some radial play so that the spring tongues 26 can adjust themselves automatically in the event of an offset between the axis of rotation of the clutch and the axis A.

The sections 38, 32 of the connecting element 30 adjoining the center area 46 form a U-shaped loop, which is located essentially in an annular space 37 extending radially between the guide tube 14 and the roller bearing 18. The connecting element 30 is designed to be very stiff in the axial direction in order to guarantee that the axial release movement of the releasing device 10 can be transmitted without play or loss, whereas the pivot arm 32 in working connection with the ends 28 of the diaphragm spring tongues have some freedom of movement in the radial direction. The number of receiving sections 32 of the connecting element 30 is preferably the same as the number of diaphragm spring tongues 26.

When the releasing device executes an axial release movement in the direction toward the clutch 12, the radial offset Y (FIG. 2) associated with the pivoting of the ends 28 of the diaphragm spring tongues causes the pivot arm 32 to be pushed radially inward, in opposition to a radially outward-acting restoring force. The pivot arm 32 is thus pivoted more-or-less around an imaginary pivot center 48 in the center area 46. The movement of the pivot arm 32 thus consists of both an axial movement and a superimposed radial movement. This compound movement thus matches exactly the pivoting movement of the spring tongues 26 caused by the releasing device. As a result of this superimposition, only an insignificant amount of friction occurs between the end 28 of a spring tongue and the pivot arm 32. This friction can be reduced even more by rounding the free end 28 and by providing the radial contact section 50 and the axial contact section 52 with complementary contours. As a result of the proposed design, the end 28 of the diaphragm spring tongue can roll on the pivot arm 32. For this purpose, it would also be possible for the diaphragm spring tongue ends 28 to be provided with the sharpest possible edges and tips and to be received by a receiving section 32 of the connecting element 30 which is also designed with the sharpest possible edges.

Figure 3:
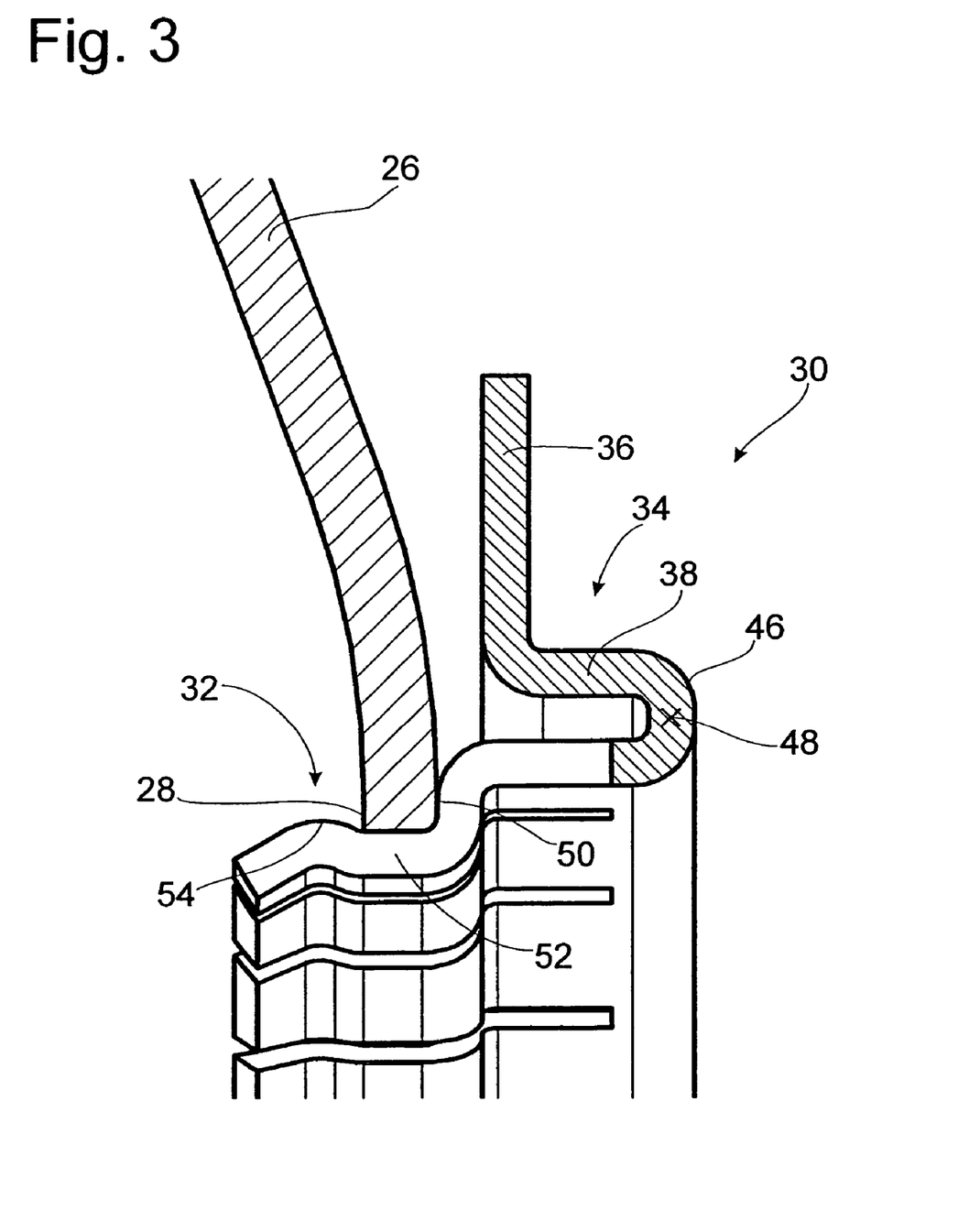
FIG. 3 shows a diagram of part of an inventive connecting element, upon which a tongue of a diaphragm spring is resting.

In the exemplary embodiment of FIGS. 1-3, the pivot center 48 is on the axial side of the diaphragm spring 24 which faces the roller bearing 18. At the same time, this center is located farther outward in the radial direction than the ends 28 of the spring tongues. In this case an axial component directed toward the roller bearing 18 is thus also superimposed on the radial component of the movement of the pivot arm 32, but this axial movement is rather small in comparison to the axial actuating movement of the releasing device 10.

Figure 4:
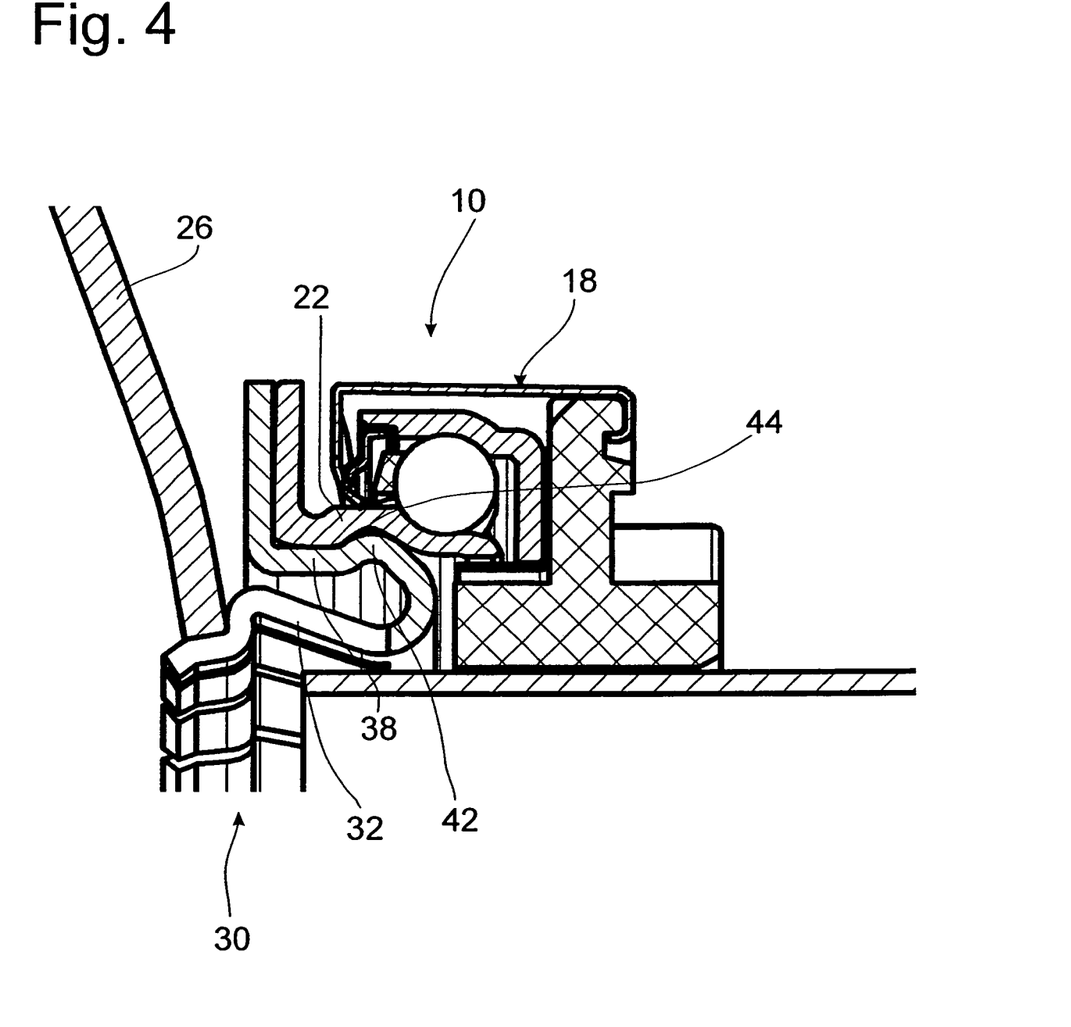
FIG. 4 shows a releasing device with a connecting element, which has been installed essentially in the annular space between the guide tube and the roller bearing by snapping it into a groove in the rotating bearing ring.

In the exemplary embodiment described on the basis of FIGS. 1-3, the connecting element 30 is installed in the inner ring 22 of the bearing by the press-fit of its tubular section 38. According to FIG. 4, it is possible in addition or alternatively for the connecting element 30 to be secured axially in the bearing ring 22 by a radial bead 42 formed on the tubular section 38. The bead can then lock into a groove 44 formed in the rotating ring 22.

Figure 5:
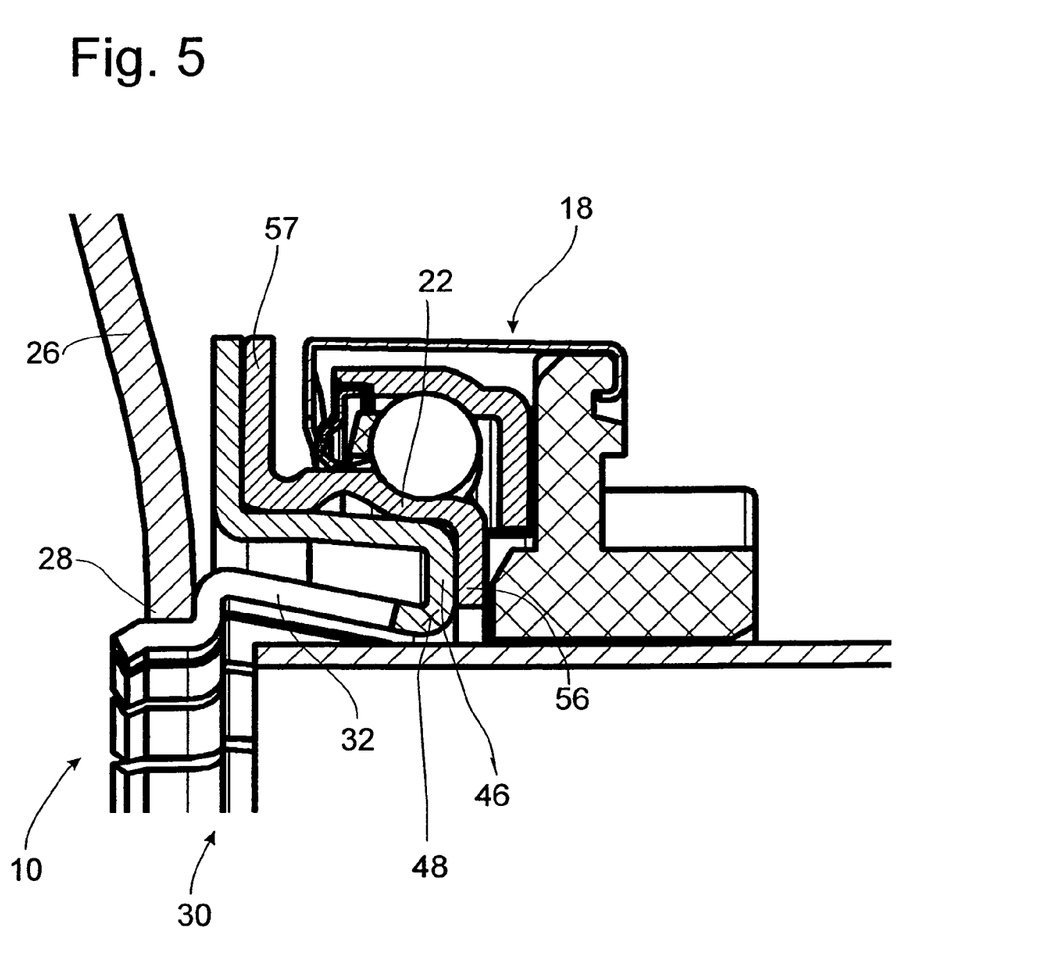
FIG. 5 shows a connecting element, which has been pressed into the annular space according to FIG. 4 and which is supported against a radial collar of the rotating bearing ring.

Even better axial support of the connecting element 30 can be achieved as shown in FIG. 5 by bringing the radially oriented center area 46 into direct contact with the release bearing 18. For this purpose, the inner ring 22 of the bearing 18 is provided with an inward-pointing radial collar 56, which, together with a second, radially outward-pointing radial collar 57, can absorb and transmit axial forces. The pivot center 48 in this exemplary embodiment is located approximately at the transition point between the center area 46 and the pivot arm 32 and is more-or-less level radially with the ends 28 of the spring tongues. As a result, the movement of the pivot arm 32, when pivoted, will be almost exclusively in the radially inward direction and to only an insignificant extent in the axial direction.

Of course, the pivot center 48 can also be moved radially inward from the ends 28 of the diaphragm spring tongues, which would have the result that the axial component of the pivoting movement of the pivot arm 32 would be added to the axial movement performed by the release bearing 18. This design shortens the actuating distance and increases somewhat the actuating force exerted during the course of the release process. If, to optimize the force transmission, for example, the pivot center is shifted radially inward from the position of the ends of the spring tongues by an amount equal to more-or-less half the value of the radial offset Y of the ends of the tongues, the result is an increase in the amount of force required during the initial actuation phase because of the axial component of the pivot arm 32, which is oriented in the same direction as the release movement. In the final actuating phase, however, the amount of force required is less than that of known friction clutches, because the axial component now acts in opposition to the release process. In this way, the maximum actuating force known from diaphragm spring-actuated clutches can be reduced and a perceptible gain in driving comfort can be obtained for the driver.

Figure 6:
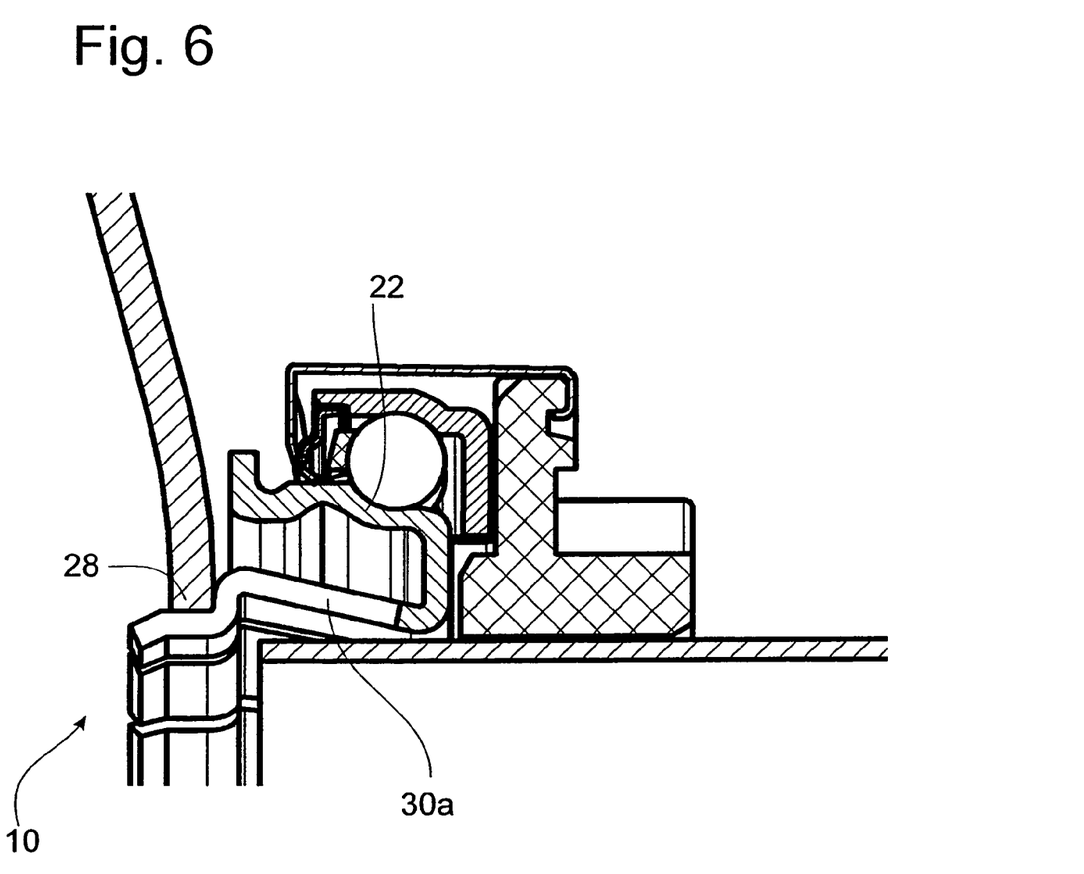
FIG. 6 shows a connecting element designed as an integral part of the rotating bearing ring.

According to FIG. 6, the arrangement according to FIG. 5 can be simplified even more by designing the connecting element 30a as an integral part of the rotating bearing ring.

Figure 7:
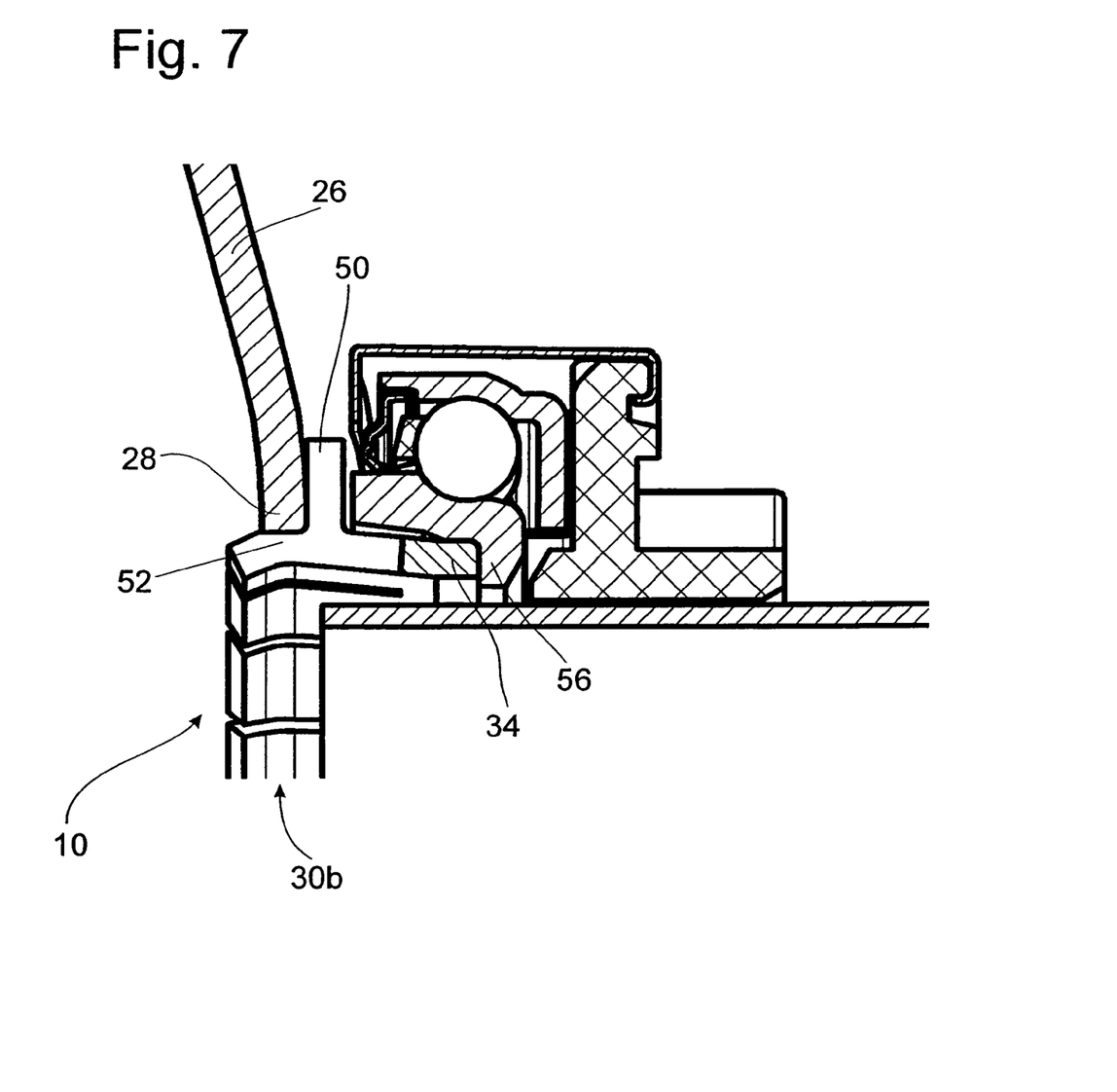
FIG. 7 shows a tubular connecting element mounted on a release bearing.

In contrast to the exemplary embodiments shown in FIGS. 1-6, in which the pivot arm forms an elastically movable sidepiece of a U-shaped loop area on the connecting element 30, the connecting element 30b shown in FIG. 7 has an even simpler design. Here the element is designed essentially in the form of a tube. One axial end of the tube, namely, the end which forms a retaining section 34, engages in a radial collar 56, formed on the inner ring 22; this collar transmits the rotational and release movement of the connecting element 30b.

Figure 8:
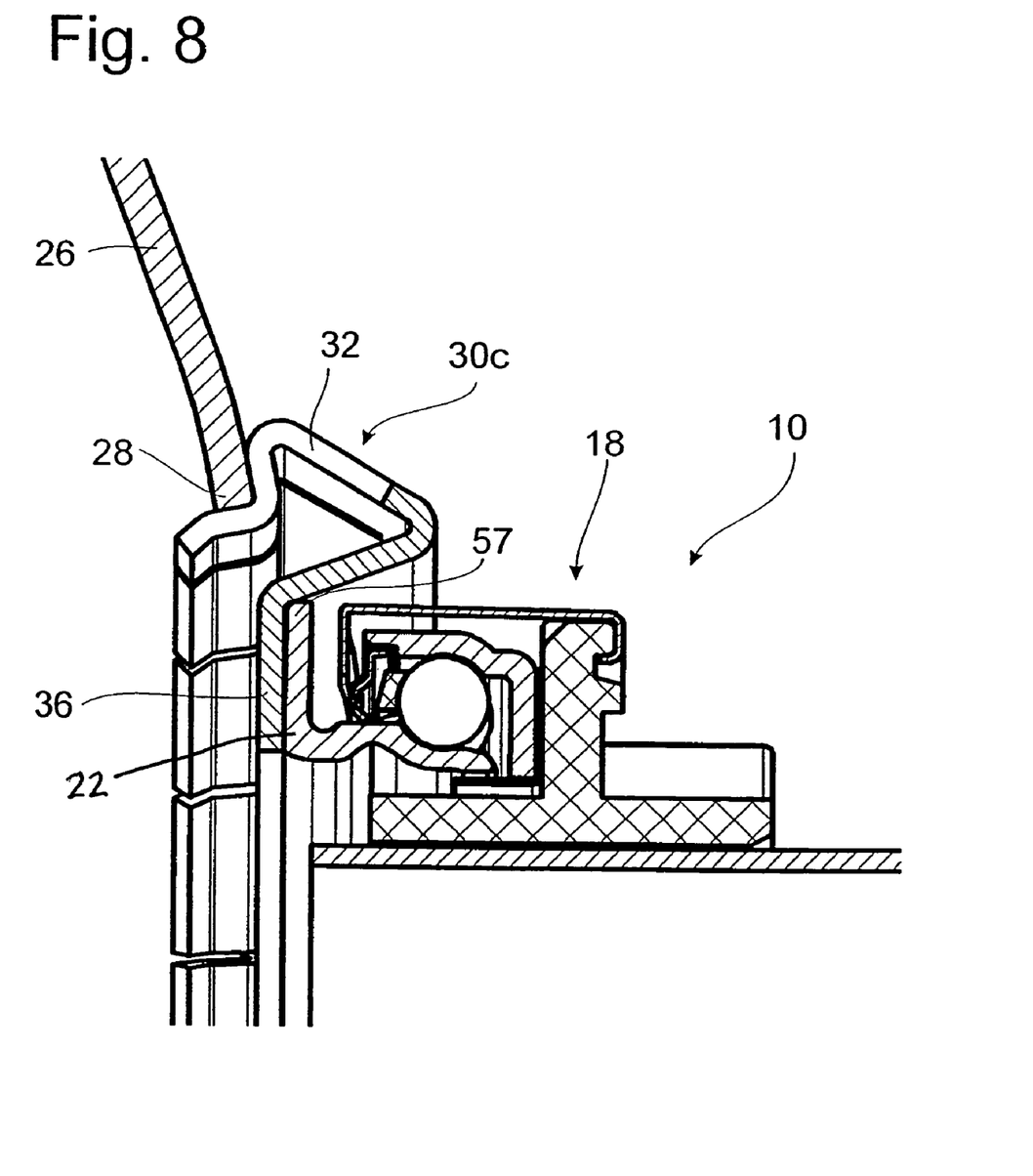
FIG. 8 shows a releasing device with a connecting element located radially outside the roller bearing.

FIG. 8 shows a variant of a releasing device 10, in which the connecting element 30c is held axially between the diaphragm spring tongue ends 28 and the rotating inner ring 22 of the roller bearing by the pretension of the diaphragm spring 24 against a radial collar 57 of the release bearing 18. The diaphragm spring tongues 26 here are shorter in the radial direction than they were in the previously described exemplary embodiments and act on the pivot arms 32 of the connecting element 30c at a point radially outside the roller bearing 18. An arrangement of this type can be effective in applications where, because of the amount of construction space available, the roller bearing 18 must be located as close as possible to the axis A of the releasing device.

Figure 9:
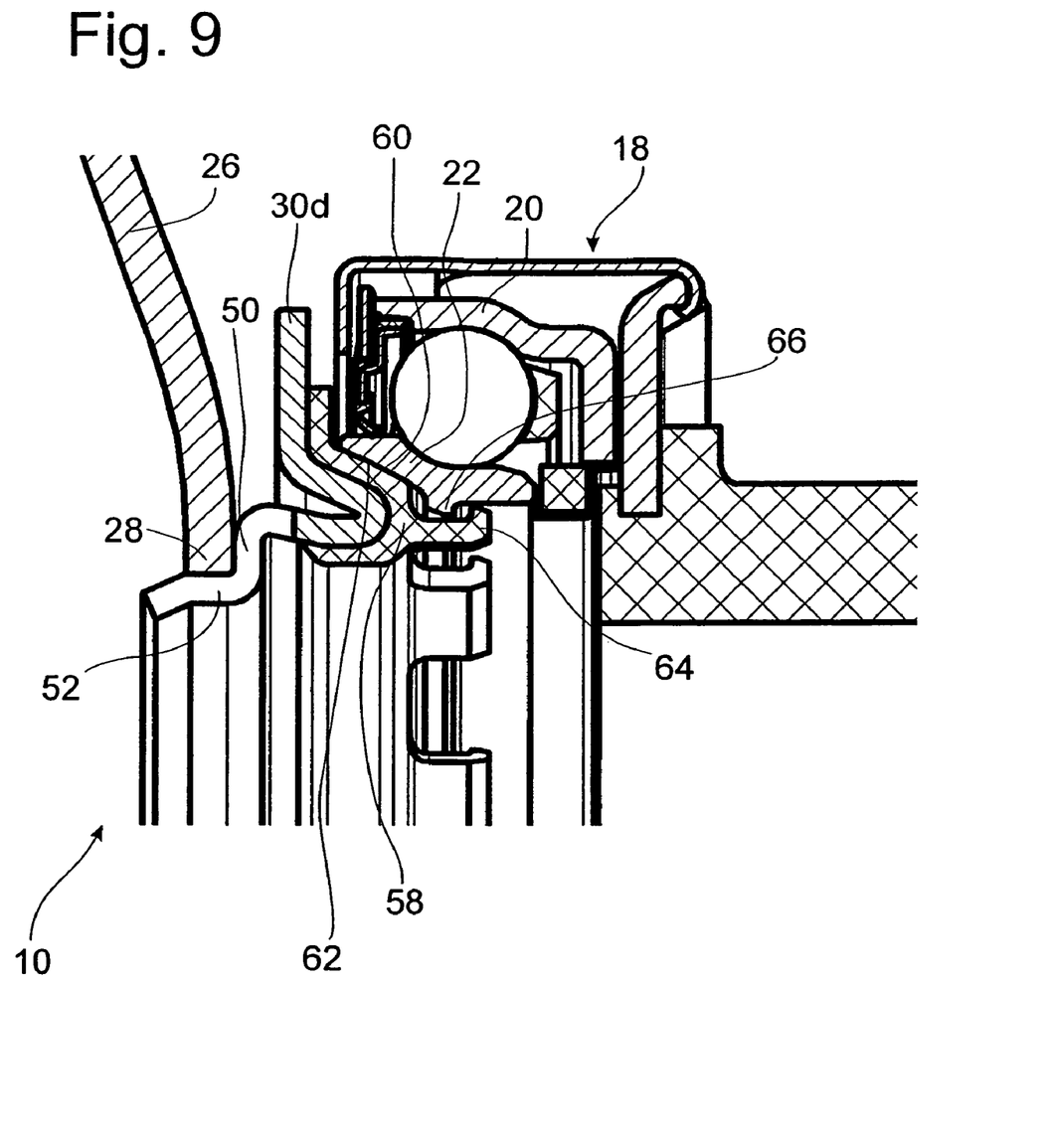
FIG. 9 shows a releasing device with a connecting element located on an adjusting ring.

According to FIG. 9, furthermore, an inventive connecting element 30d with a releasing device can be realized together with a device for compensating for wobbling movements. This device has a plastic adjusting ring 58, which works as a slide element. This ring has a surface section 62, which is oriented convexly toward the roller bearing 18 and which is in contact with a concave surface section 60 on the inner ring 22 with the same spherical radius. The adjusting ring 58 has latching hooks 64 which grip behind a radially inward-pointing, ring-shaped web 66 on the inner ring 22, as a result of which the overall arrangement is free to pivot but the adjusting ring cannot be lost. The connecting element 30d is connected nonrotatably to the adjusting ring 58 by means of a positive connection in the form of a snap-in connection, for example, or the plastic adjusting ring 58 can be injected-molded onto the connecting element 30d. The connecting element 30d can also form a stiffening element or base structure for the adjusting ring 58, which can then be made less massive.

Figure 10:
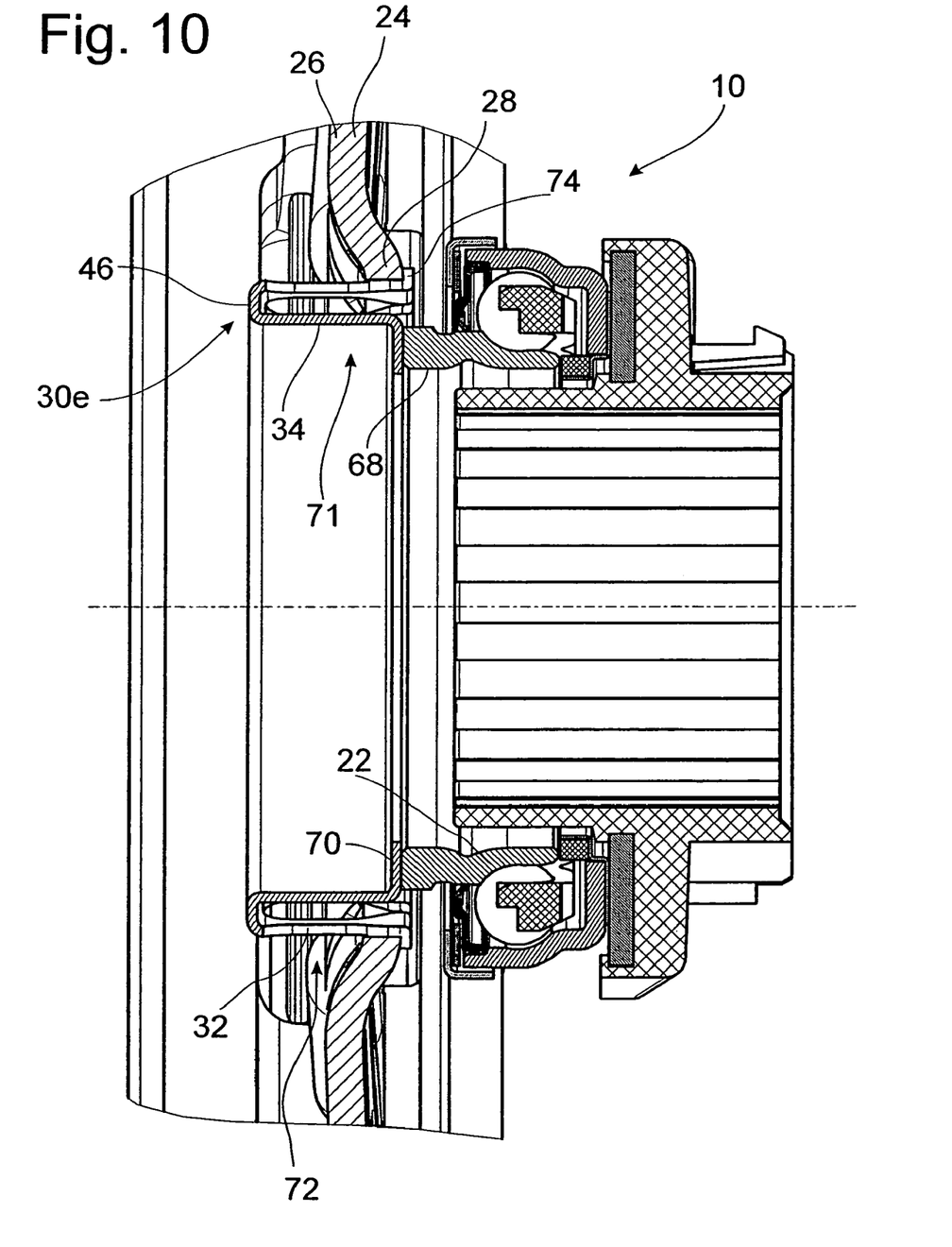
FIG. 10 shows a releasing device with a connecting element designed as a double-walled tube.

In yet another exemplary embodiment according to FIG. 10, the connecting element 30e is designed as a double-walled tubular profile, closed at one end by the center area 46. On the radially inward side, the tube section 71 forms the retaining section, whereas the radially outward tube section 72 is segmented in the circumferential direction and forms the pivot arms 32. The inner tube section 34 is supported by a ring-shaped contact section 70 against the end of an axial projection 68 of the inner ring 22 in such a way that that it can slide in the radial direction for the sake of adjustment, as a result of which the connecting element 30e is held in a self-centering manner on the release bearing 18. The connecting element 30e is located essentially on the axial side of the diaphragm spring 24 which faces the clutch 12, whereas the ends 28 of the diaphragm spring tongue are gripped from behind by a radially outward-pointing collar 74 and can thus be pivoted during the clutch-release operation in the direction toward the clutch 12. The inner tube section 71 is made extremely stiff in the axial direction; in contrast, the axial stiffness designed into the pivot arms 32 plays a subordinate role because of the change in the direction in which the release force acts on the spring tongue ends 28, this direction now being the reverse of that present in the previously described exemplary embodiments. As a result, the pivot arms 32 can be optimized with respect to their elastic mobility in the radial direction. With respect to the amount of space it requires, this variant is more-or-less neutral in relation to the exemplary embodiments known from the state of the art, because a previously unused space is used to accommodate the connecting element 30e.

The connecting element 30e shown in FIG. 10 rests against the inner ring 22 of the bearing only by virtue of the pretension of the diaphragm spring tongues 26. According to FIG. 11, a retaining plate 76 is also provided to keep the connecting element 30f on the releasing device 10. This plate has a tubular section 77, which snaps into the groove 44 in the inner ring 22. It also has an outward-directed ring collar 78, which holds the contact section 70 of the connecting element 30f against the axial projection 68.

Figure 11:
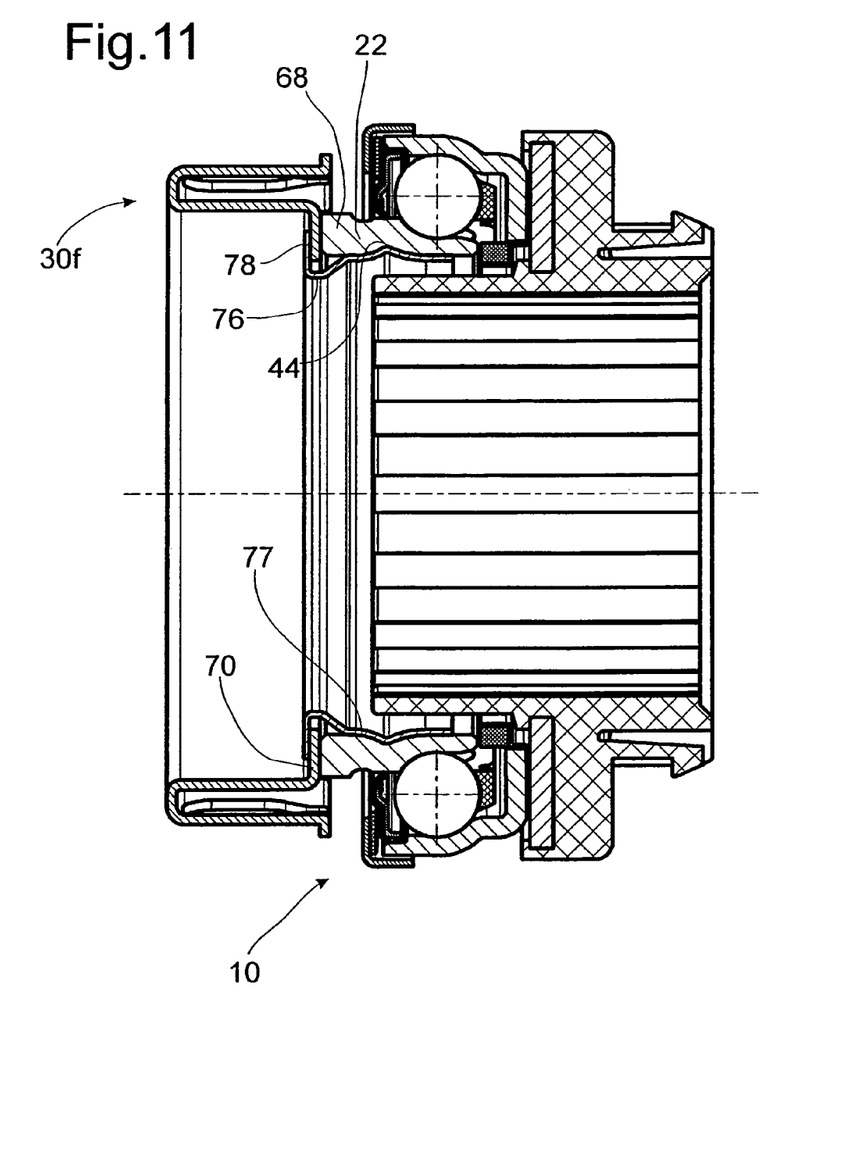
FIG. 11 shows a connecting element according to FIG. 10, which is attached to a retaining plate on the releasing device.
Figure 12:
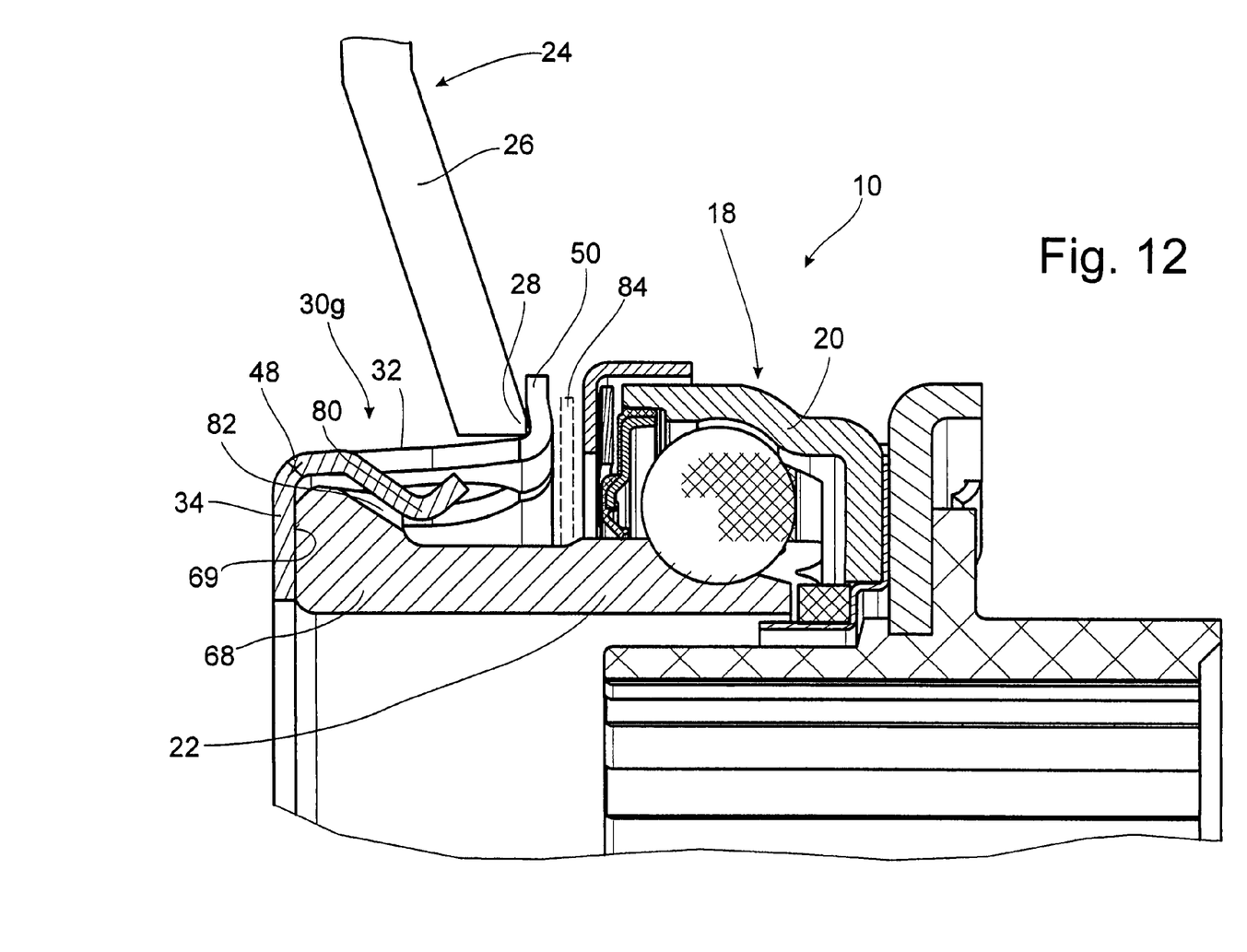
FIG. 12 shows a releasing device with a connecting element, which is located on an axial extension of the inner ring of the release bearing.

FIG. 12 shows a releasing device 10 based on the design of FIG. 11. Here the inner ring 22 of the bearing has been provided with an axial projection 68, which extends even farther toward the friction clutch 12. The connecting element 30g has a disk-shaped, radially oriented retaining section 34 by which it is supported against an axial contact surface 69 of inner ring. The retaining section 34 merges in its radially outer area into a plurality of essentially axial pivot arms 32, extending in the direction toward the release bearing 18, each of which forms a radial contact section 50 to receive and support the spring tongue ends 28. Reference number 48 designates again the position of the pivot center of the pivot arms 32. The mutual contact surface between the spring tongue ends 28 and the connecting element 30g is reduced to such an extent that essentially only an edge of the spring tongue end 28, located in the radially inward area in FIG. 12, is left and thus forms line contact with the section 50. In this way, the connecting element 30g is held in place with respect to the circular central opening defined by the spring tongue ends 28. This also applies to the connecting elements 30, 30a-f of the previous exemplary embodiments. To compensate for an offset between the axis of rotation of the diaphragm spring 24 and the axis of the rotating inner ring 22 of the bearing, the inside diameter of the connecting element 30g is made somewhat larger than the outside diameter of the extension 68. Thus the connecting element 30g can slide radially on the contact surface 69. In the presence of an offset between the axes, an alternating radial load would otherwise be exerted on the pivot arms 32 simply by reason of the rotation of the elements 24, 30g, and 22, but the ability of the connecting element to slide radially eliminates this possibility. So that the connecting element 30g can be preassembled on the release bearing 18, several elastic retaining fingers 80, which extend radially inward at an angle, are distributed around its circumference. These fingers fit with a certain clearance into corresponding recesses 82 in the axial projection 68 and thus grip the inner ring of the bearing from behind.

An inventive connecting element is designed in such a way that no wear and in particular no material fatigue will occur as a result of alternating loads on the pivot arms 32 during the intended service life of the overall clutch system under normal operating conditions. Under especially extreme load states such as those which occur in racing, however, it can be advantageous to provide another possibility besides the connecting element by which the spring tongue ends 28 can interact with the rotating inner ring of the bearing 22, i.e., another surface on which the diaphragm spring tongues 26 can rest in the event that the connecting element 30g becomes defective. In the exemplary embodiment according to FIG. 12, a flange 84 (shown in broken line) extending out radially from the inner ring 22 of the bearing can be formed axially adjacent to the section 50 for this purpose.

The connecting element described on the basis of FIGS. 1-12 can be produced advantageously out of spring steel by conventional forming, hardening, and tempering techniques. In all variants, furthermore, the connecting element can be provided with engaging means, e.g., radial webs, which fit into the intermediate spaces between the tongues of the diaphragm spring and thus allow the element to be carried along rotationally. A connecting element can be preassembled either on the releasing device or on the diaphragm spring and thus delivered as a unit with either the releasing device or the clutch.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A release device for a friction clutch comprising a diaphragm spring having spring tongues with radially inner ends which can be moved axially in opposition to a restoring force in order to release the clutch, the spring tongues pivoting so that the inner ends move radially as they move axially, the release device comprising:
   a guide tube;
   a sliding sleeve received on the guide tube and movable axially with respect to the guide tube;
   a release bearing mounted coaxially to the sliding sleeve, the release bearing having a first bearing race which is fixed against rotation with respect to the sliding sleeve, a second bearing race which is rotatable with respect to the first bearing race, and a plurality of rolling elements between the bearing races;
   an annular space between the release bearing and the guide tube; and
   a connecting element having a retaining section which is supported against the second bearing race and a receiving section comprising a plurality of radially resilient pivot arms which engage the inner ends of said spring tongues and which are radially movable with the inner ends of the spring tongues, wherein the pivot arms are located at least partially in the annular space.

2. The release device of claim 1 wherein the resilient pivot arms engage respective said inner ends of the spring tongues.

3. The release device of claim 1 wherein the retaining section comprises a radially oriented disk and an axially oriented tubular section which engages the second bearing race.

4. The release device of claim 3 wherein the connecting element further comprises a radially oriented center area connecting the tubular section of the retaining section to the pivot arms, the pivot arms extending essentially axially from the center area.

5. The release device of claim 4 wherein the pivot arms pivot about an imaginary pivot center located in the center area.

6. The release device of claim 5 wherein the pivot center is located on an axial side of the diaphragm spring which faces the release bearing.

7. The release device of claim 5 wherein the pivot center is located in a radial position which is essentially level with the ends of the spring tongues.

8. The release device of claim 4 wherein the center area of the connecting element is supported against the second bearing race.

9. The release device of claim 1 wherein the second bearing race is formed as one piece with the connecting element.

10. The release device of claim 1 wherein the connecting element is installed with radial play with respect to the second race.

11. A release device for a friction clutch comprising a diaphragm spring having spring tongues with radially inner ends which can be moved axially in opposition to a restoring force in order to release the clutch, the spring tongues pivoting so that the inner ends move radially as they move axially, the release device comprising:
   a guide tube;
   a sliding sleeve received on the guide tube and movable axially with respect to the guide tube;
   a release bearing mounted coaxially to the sliding sleeve, the release bearing having a first bearing race which is fixed against rotation with respect to the sliding sleeve, a second bearing race which is rotatable with respect to the first bearing race, and a plurality of rolling elements between the bearing races; and a connecting element having a retaining section which is supported against the second bearing race and a receiving section comprising a plurality of radially resilient pivot arms which engage said inner ends of said spring tongues and which are radially movable with the inner ends of the spring tongues, wherein the pivot arms are located radially inside the release bearing.

12. A release device for a friction clutch comprising a diaphragm spring having spring tongues with radially inner ends which can be moved axially in opposition to a restoring force in order to release the clutch, the spring tongues pivoting so that the inner ends move radially as they move axially, the release device comprising:
   a guide tube;
   a sliding sleeve received on the guide tube and movable axially with respect to the guide tube;
   a release bearing mounted coaxially to the sliding sleeve, the release bearing having a first bearing race which is fixed against rotation with respect to the sliding sleeve, a second bearing race which is rotatable with respect to the first bearing race, and a plurality of rolling elements between the bearing races; and
   a connecting element having a retaining section which is supported against the second bearing race and a receiving section which engages the inner ends of the spring tongues, said retaining section comprising a radially oriented disk and an axially oriented tubular section which engages the second bearing race, said tubular section being formed with a radial bead which engages the second bearing race, wherein said receiving section engages the inner ends of the spring tongues and is radially resiliently movable with the inner ends of the spring tongues.

13. The release device of claim 12 wherein the second bearing race comprises an actuation element which bears against the diaphragm spring tongues.

14. A release device for a friction clutch comprising a diaphragm spring having spring tongues with radially inner ends which can be moved axially in opposition to a restoring force in order to release the clutch, the spring tongues pivoting so that the inner ends move radially as they move axially, the release device comprising:
   a guide tube;
   a sliding sleeve received on the guide tube and movable axially with respect to the guide tube;
   a release bearing mounted coaxially to the sliding sleeve, the release bearing having a first bearing race which is fixed against rotation with respect to the sliding sleeve, a second bearing race which is rotatable with respect to the first bearing race, and a plurality of rolling elements between the bearing races; and
   a connecting element having a retaining section which is supported against the second bearing race and a receiving section comprising a plurality of radially resilient pivot arms which engage the inner ends of the spring tongues and which are radially resiliently movable with the inner ends of the spring tongues, said retaining section comprising a radially oriented disk and an axially oriented tubular section which engages the second bearing race, the connecting element further comprising a radially oriented center area connecting the tubular section to the pivot arms, wherein the pivot arms extend essentially axially from the center area and pivot about an imaginary pivot center located in the center area, wherein the pivot center is located on an axial side of the diaphragm spring which faces the clutch.

15. A release device for a friction clutch comprising a diaphragm spring having spring tongues with radially inner ends which can be moved axially in opposition to a restoring force in order to release the clutch, the spring tongues pivoting so that the inner ends move radially as they move axially, the release device comprising:
   a guide tube;
   a sliding sleeve received on the guide tube and movable axially with respect to the guide tube;
   a release bearing mounted coaxially to the sliding sleeve, the release bearing having a first bearing race which is fixed against rotation with respect to the sliding sleeve, a second bearing race which is rotatable with respect to the first bearing race, and a plurality of rolling elements between the bearing races; and
   a connecting element having a retaining section which is supported against the second bearing race and a receiving section comprising a plurality of radially resilient pivot arms which engage respective said inner ends of said spring tongues and which are radially movable with the inner ends of the spring tongues, wherein each said pivot arm comprises a radial contact section and an axial contact section which both make contact with the end of a respective said spring tongue.

16. The release device of claim 15 wherein each said pivot arm has a snap-in contour which receives the end of a respective said spring tongue.

17. A release device for a friction clutch comprising a diaphragm spring having spring tongues with radially inner ends which can be moved axially in opposition to a restoring force in order to release the clutch, the spring tongues pivoting so that the inner ends move radially as they move axially, the release device comprising:
   a guide tube;
   a sliding sleeve received on the guide tube and movable axially with respect to the guide tube;
   a release bearing mounted coaxially to the sliding sleeve, the release bearing having a first bearing race which is fixed against rotation with respect to the sliding sleeve, a second bearing race which is rotatable with respect to the first bearing race, and a plurality of rolling elements between the bearing races;
   a connecting element having a retaining section which is supported against the second bearing race and a receiving section which engages the inner ends of the spring tongues, wherein said receiving section is radially resiliently movable with the inner ends of the spring tongues; and
   an adjusting ring fitted between the second race and the connecting element to adjust for wobbling movements of the diaphragm spring, the adjusting ring having a contact area for the second bearing race which allows the adjusting ring to pivot with respect to the second bearing race.

18. The release device of claim 17 wherein the adjusting ring is installed on the second race with play.

19. A release device for a friction clutch comprising a diaphragm spring having spring tongues with radially inner ends which can be moved axially in opposition to a restoring force in order to release the clutch, the spring tongues pivoting so that the inner ends move radially as they move axially, the release device comprising:

a guide tube;

a sliding sleeve received on the guide tube and movable axially with respect to the guide tube;

a release bearing mounted coaxially to the sliding sleeve, the release bearing having a first bearing race which is fixed against rotation with respect to the sliding sleeve, a second bearing race which is rotatable with respect to the first bearing race, and a plurality of rolling elements between the bearing races; and a connecting element having a retaining section which is formed as one piece with said second bearing race, and a receiving section which is formed as one piece with said retaining section, wherein said receiving section engages the inner ends of the spring tongues and is radially resiliently movable with the inner ends of the spring tongues.

* * * * *